INVENTOR
DAVID E. KEEFER
BY Cushman, Darby + Cushman
ATTORNEYS

Nov. 19, 1963 D. E. KEEFER 3,111,580

MEMORY UPDATING

Filed Oct. 7, 1960 2 Sheets-Sheet 2

INVENTOR
DAVID E. KEEFER

BY Cushman, Darby + Cushman
ATTORNEYS

United States Patent Office 3,111,580

Patented Nov. 19, 1963

3,111,580
MEMORY UPDATING

David E. Keefer, Houston, Tex., assignor to Sperry Rand Corporation, New York, N.Y., a corporation of Delaware Filed Oct. 7, 1960, Ser. No. 61,276
31 Claims. (Cl. 235—175)

This invention relates to a memory with updating provisions, and in particular to the updating of a binary number in at least one register by decimal 1, or by a binary addend.

The main object of this invention is to provide a single register, or a plurality of registers, for example as in a computer memory device, with the capability of being updated directly, i.e., without first having to read the word out of the register in question.

The invention is illustrated in two different embodiments one of which may be referred to as a "counting memory," and the other of which may be referred to as an "adding memory." In the counting memory, the binary word in a given register may be directly incremented by a decimal count of 1 while it is still in that register. In the adding memory, the binary word of a given register may be directly added to in accordance with a binary addend, or may be updated by demical 1 in the same manner as the counting memory if no end-around carry is employed. Therefore, this invention has the advantage of eliminating all external registers or counters previously required for addition or counting, except of course the addend register. In addition, the speed of the counting operation in the one embodiment, and of the summing operation in the other embodiment, is greatly increased over prior art methods.

Therefore, a further object of this invention is the provision of memory updating apparatus which allows updating of a binary word without removal thereof from its original register.

Another object of the invention in conjunction with the preceding object is to greatly increase the speed of the updating operation over that which was heretofore possible.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

FIGURE 1 illustrates a counting memory, i.e., a memory with updating provisions. In particular, the counting memory is of the type in which a binary word stored in a register may be increased by a value of decimal 1, upon the application of a count pulse to input line 10.

Figure 1:
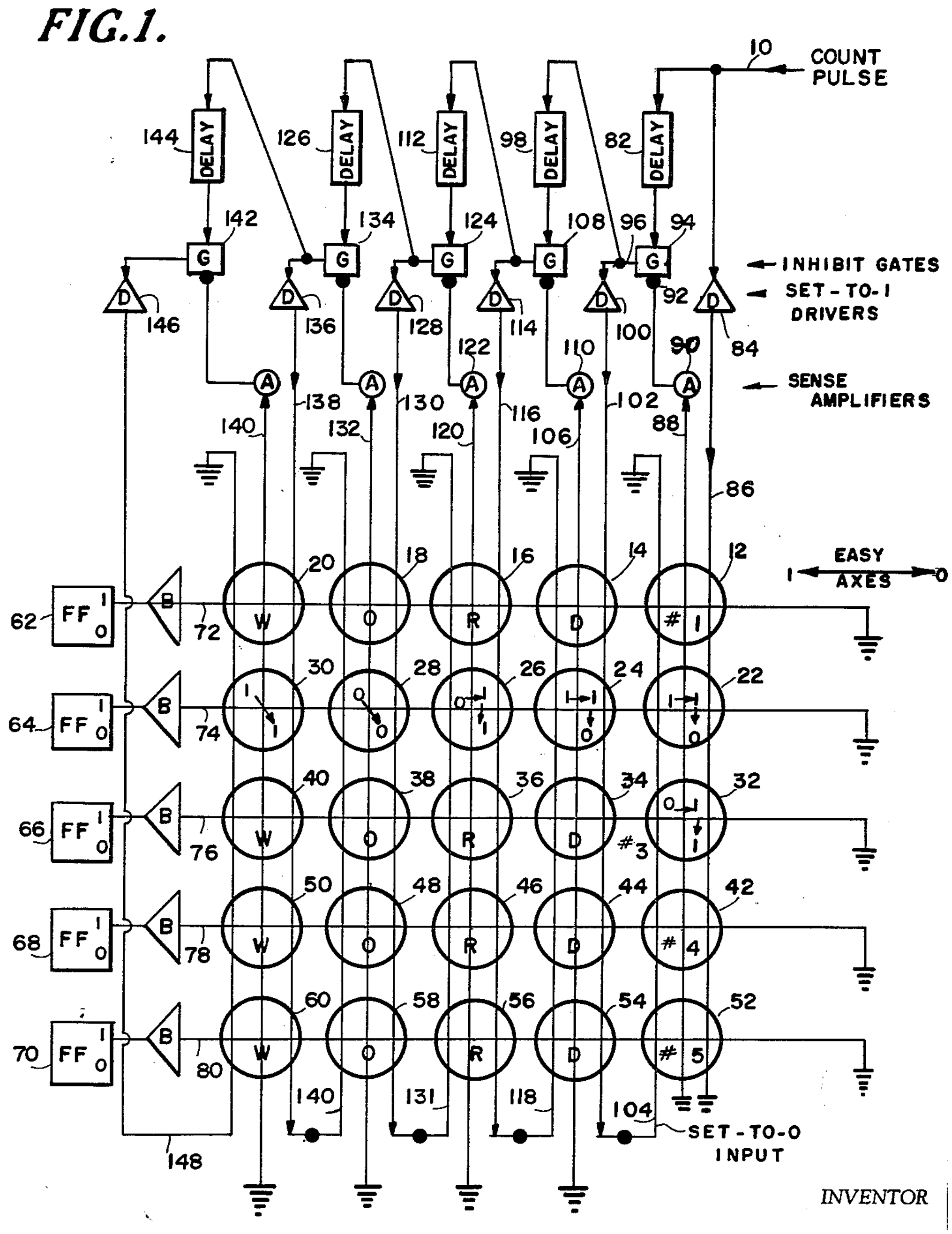
FIGURE 1 is a schematic illustration of a counting memory.

Each binary word is stored in a register which comprises a plurality of bistable stages each of which is switchable between first and second stable states. For example, what might be referred to as "Word No. 1" is stored in the register comprising bistable stages 12, 14, 16, 18 and 20, while binary words numbers 2, 3, 4 and 5 are stored in the different groups of bistable stages respectively comprising stage groups 22–30, 32–40, 42–50, and 52–60. Preferably, each of the stages in the memory array is a bistable magnetic element, and more preferably each such element is a ferromagnetic film such as of the type producible in accordance with the Rubens Patent No. 2,900,282. In such cases, the films will have uniaxial anisotropy with a single easy axis of magnetization and a single hard axis of magnetization transverse to the easy axis, and they are preferably limited in thickness to a single domain. Such films are generally referred to as being "thin." "Ferromagnetic" as used in this application is intended to include reference to any magnetic element which exhibits ferromagnetism and has a net amount of remanence, and so includes ferromagnetic materials (e.g., the ferrites), but not antiferromagnetic materials which exhibit no net remanence.

Any suitable magnetic element which is bistable and has a remanent magnetization axis whereby the two different stable states are respectively represented by magnetization in opposite directions along that axis, may be employed as the bistable element for each stage of each word register. When the memory includes more than one such register, it is desirable to be able to select any one register as opposed to all of the other registers. This may be accomplished by priming each bistable stage in any one register. When the registers contain magnetic elements, such "priming" may be effected by magnetically biasing each such element in a register. When so primed or biased, any stage in a so selected register may be switched from its instant stable state to the other upon receipt of a further signal. To effect biasing of each magnetic element in any register of FIGURE 1, there are provided a plurality of switches, one for each word register, such as flip-flops 62, 64, 66, 68 and 70. When any one of these flip-flops is set by means not shown, to one of its states, an output signal is applied to the respective bias generator B to cause a signal on the associated one of lines 72–80. This signal effects a field which is caused to be transverse of the remanent or easy magnetization axis of each of the magnetic elements associated with it, by the orientation of the field in the area of coupling to each element effected by input lines 72–80. For magnetic films especially of the uniaxial anisotropy type, the transverse field applied thereto by one of lines 72–80 is along the "hard" or "difficult" film axis, which is substantially orthogonal to the easy axis thereof. Also, with such films, the presence of a transverse field allows a field applied along the easy axis to effect switching of the film, but only if the transverse field is present. That is, the field applied along the easy axis, generally referred to as the "longitudinal" field, alone may be made insufficient to switch a film except in the presence of a transverse field. However, as above indicated, if there is only one binary word register which is to be updated, the application of a transverse field to each magnetic element in the register is unnecessary, since there then needs to be no selection of one register as opposed to others. In such a case, the transverse field applying means may be dispensed with as long as the longitudinal field is made large enough to itself switch the magnetic element. Without the aid of a transverse field, however, switching of the magnetic elements will be slower, much slower if the elements are films whose magnetization vectors are rotated in accordance with the teachings in the Rubens et al. application, Serial No. 626,945, filed December 7, 1956, now Patent No. 3,030,612.

The count pulse arriving on line 10 is applied in parallel to a delay 82 and a driver 84, which may have amplification properties as desired. Whenever driver 84 applies a signal to its output line 86, which is an input line for the order of elements, that signal functions to set any one of the lower order magnetic elements 12, 22, 32, 42, 52 when it is biased by a transverse field, to its 1 state, considering that state as corresponding to the binary 1 of a lower order digit of a stored word. If the biased lower order element is already in its 1 state, no change in state is effected by the input signal on line 86. Conversely, if the biased lower order element is in its 0 state, the input signal via line 86 causes that element to change to its 1 state. Consequently, line 86 may therefore be thought of as a "set-to-1" input to the lowest element order whether a signal on line 86 actually changes the biased element's state from 0 to 1 or just does not change it from 1, with driver 84 correspondingly being a "set-to-1" driver. These two different situations are represented by the horizontally disposed numbers within elements 22 and 32 above their respective transverse field applying lines 74, 76, with the number on the left of line 88 (fourth quadrant, so to speak) representing the initial state of the element as well as the initial binary value of the lower order digit of the respective stored word.

Since element 32 changed state under the assumptions above given, an appreciable signal is induced in output line 88 which couples all of the lower order elements. Consequently, that signal on line 88 via sense amplifier 90 when applied to the inhibit input 92 of an And-Not circuit or inhibit gate 94, is sufficient to prevent passage of the delayed count pulse to the output 96 of gate 94. However, if the biased element is element 22 which is initially in its 1 state, the input signal on line 86 does not cause a change of state of that element. Therefore, no appreciable signal is applied via output line 88 to amplifier 90, and the delayed count pulse as Anded with the inverted output of amplifier 90 is passed to the inhibit gate output 96. This output signal is applied in parallel to delay 98 and a set-to-1 driver 100 for the second column or order of magnetic elements. The resulting signal from driver 100 is coupled by line 102 as an input signal to each of the elements 14, 24, 34, 44, 54 (the second order elements) to affect the biased one of those elements in the same manner as previously described for an input signal on line 86 relative to the lowest order of elements. Line 102 is also connected to line 104, serially as shown though the two lines could be in parallel. Line 104 couples each of the magnetic elements in the lower order in a direction opposite to the coupling thereof by line 86. Consequently, any signal passed by gate 94 is effective via line 104 to switch any biased element in the lower order to its 0 state. This is indicated for magnetic element 22 by the number therewithin below line 74 (second quadrant). Line 104 may consequently be thought of as a "set-to-0" input.

In retrospect, then, it will be apparent that if element 22 were the selectively biased lower order element, it would not be switched by an input signal on line 86 because it was initially in a 1 state and the polarity of that signal and resultant field is such as to cause that element to remain in its 1 state. As a consequence of such no switching a signal would result on line 104 causing element 22 to switch to 0. On the other hand, if element 32 were the selectively biased lower order element and its initial state were 0 as above assumed, it would be switched by a set-to-1 signal on line 86 causing an output signal to gate 94 which inhibits passage of the delayed count pulse and consequently prevents any set-to-0 signal on line 104. In other words, due mainly to the And-Not function of inhibit gate 94, a biased element of the lowest order gets switched from its second state (1) to its first state (0) by the delayed count pulse via line 104 only if that element was not initially switched by the count pulse via line 86 from its first state (0) to its second state (1).

The delay factor attributable to delay 82 depends upon the circuit constants, and is such as to provide an output to gate 94 at a time coincident with any output from amplifier 90 caused by a signal on line 86. In general, the delay of the count pulse through delay 82 may be said to be substantially equal to the sum of the delays offered by driver 84, sense amplifier 90, and lines 86 and 88. The time delay associated with delay 98, and all the other delays in FIGURE 1, as well as in FIGURE 2, may be similarly calculated.

The count pulse on line 10, when propagated through gate 94, operates via driver 100 and line 102 to set the biased one of the second order magnetic elements 14, 24, 34, 44, 54 to its 1 state if not already therein, in the same manner as previously described that the count pulse via driver 84 operates on the biased one of the lower order elements. If the biased element in the second order changes from 0 to 1 due to a signal on line 102, then an output signal is induced on output line 106 causing the count pulse as again delayed, this time by delay 98, to be inhibited from passing through inhibit gate 108. The output signal on line 106 may be amplified by an amplifier 110 is desired. However, if the biased element in the second order is already at 1 when a pulse is applied via line 102 and consequently does not change state, gate 108 passes the delayed count pulse to the third order delay 112 in parallel with the third order set-to-1 driver 114. The output of that driver is coupled by line 116 to a set-to-1 input of each of the third order bistable elements 16, 26, 36, 46, 56, and by line 118 to the set-to-0 input of the second order of the elements. Consequently, operation of the elements in the second order is the same as that described for the first order elements. Further, since each of the other orders of elements similarly has a set-to-1 driver and input and a set-to-0 input as well as an associated delay and inhibit gate with the output of any one inhibit gate being coupled to the input of the next higher order delay in parallel with the input to the next higher order set-to-1 driver D assuming there is such a next higher order, the operation of all the orders is the same as that above described for the first and second orders.

As an example of the overall operation of the counter, assume the binary number stored in the register comprising elements 22–30 is 10011 the equivalent of decimal 19. With such a binary number stored in the register, element 30 is in its 1 state as indicated in the drawing in the fourth quadrant of that element, elements 26 and 28 are in their 0 states, and elements 22 and 24 are in their 1 states. Further, assume that the word in this register is the one to be updated by decimal 1. To select this register to the exclusion of others, each bistable stage must be primed. Therefore, flip-flop 64 is set to cause via its biased generator B a signal on line 74 which effects a transverse field for each of the bistable elements in the register. This biases each of those elements tending to rotate the magnetization thereof away from its easy axis.

At the same time, or subsequently while the transverse fields still exist, a count pulse is applied to line 10. The consequent output of driver 84 as it appears on line 86 has no effect on the biased magnetic element 22 since that element is already in its 1 state. Hence, no appreciable signal is induced in sense line 88, and the first order inhibit gate 94 is consequently capable of passing the delayed count pulse. The output of gate 94 may be considered a "carry" pulse which when applied via driver 100 to each of the second order magnetic elements not only assures that element 24 is at 1, but also causes, via its return path 104, element 22 to change to 0. Since element 24 was already in its 1 state, no switching occurred due to the pulse on line 102. Therefore, appreciable output results on line 106, and gate 108 is not inhibited but passes the delayed carry pulse to the third order units.

The output of driver 114 is applied by line 116 to all of the elements in the third order and causes the biased element 26 to change from 0 to 1, and additionally via line 118 causes element 24 to change from 1 to 0. The change of state of element 26 causes an output signal on line 120 which through amplifier 122 inhibits the passage of a pulse from delay 112 through inhibit gate 124. Consequently, neither delay 126 nor driver 128 receives any input signal. This means that there is no input pulse on the set-to-1 input line 130 for the fourth order of elements, and no input pulse on the set-to-0 input line 131 for the third order of elements. Elements 26 and 28 therefore do not change from their respective 1 to 0 states. Since element 28 does not switch, no pulse on output line 132 results. Gate 134 is therefore not inhibited but since gate 124 provided no output to delay 126, there is no output pulse from gate 134; hence there is no pulse gated through driver 136 and over line 138 to the set-to-0 input line 139 for the fourth order of elements. Element 28 consequently remains at 0. For the same reasons, the state of element 30 is not changed. That is, with no input signal on line 138, no output signal results on line 140 to inhibit gate 142, but with no pulse into delay 144 no pulse passes gate 142 to driver 146. Therefore, there is no pulse via line 148 to the set-to-0 input of the fifth order of elements, so element 30 remains at 1. As shown in the second quadrant in each of the word No. 2 stages, the resulting word is the binary number 10100, which is equivalent to the decimal number 20. In other words, the number in the register has been incremented by decimal 1.

Figure 2:
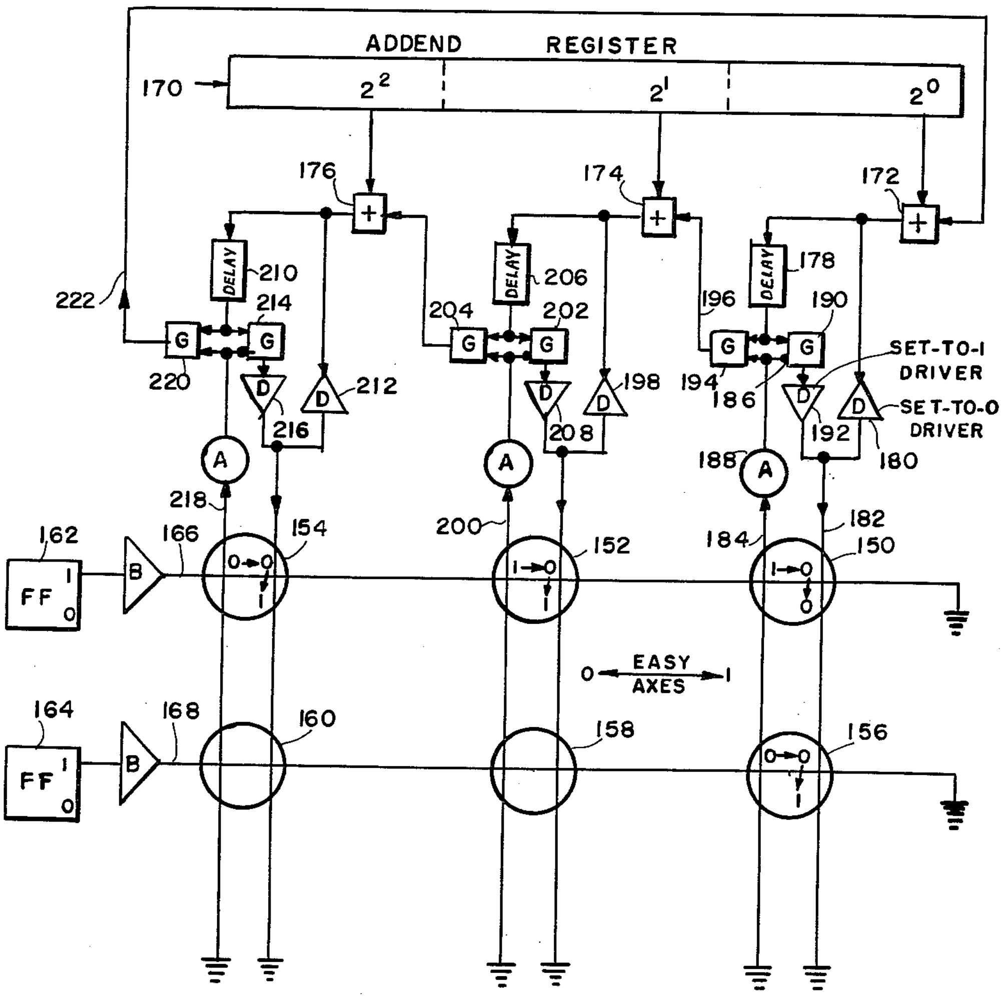
FIGURE 2 is a schematic illustration of an adding memory.

The second embodiment of a memory with updating provisions is shown in FIGURE 2 which particularly relates to an adding memory. This memory, as well as the one in FIGURE 1, is of the word organized type. Only two registers, each with three bistable stages, is illustrated, but of course either of these numbers may be increased or decreased, the same as for the embodiment of FIGURE 1. The first register comprises bistable stages 150, 152 and 154, while the second includes bistable stages 156, 158 and 160. Again, each of these stages may be as described for the respective stages in the FIGURE 1 array, and the description will proceed as though they are each a magnetic element. For purposes of selecting one or the other of the registers, flip-flop type switches 162 and 164 may be employed so as to effect through their respective bias generators B, a signal on one or the other of lines 166, 168. Such a signal effects a field which is transverse to the remanent or easy axis magnetization of the magnetic elements. When all the elements in any one register are biased, that register is selected for updating in accordance with the contents of the addend register 170. Each binary stage in the addend register is respectively coupled at its output to an Or circuit. For example, the lowest order stage of the register is coupled to Or circuit 172, the second stage to Or circuit 174, and the third or highest order stage of the illustrated register is coupled to Or circuit 176.

When a pulse is applied to Or circuit 172, that pulse is conveyed in parallel to delay 178 and a driver 180, the output of which is coupled to line 182. This line links each element in the lowest order of elements, and consequently any signal on that line, due to its polarity, tends to switch any biased element to the state associated with the polarity of that signal. In this case, the driver 180 is a set-to-0 driver so that if element 150 is presumed to be in its 1 state initially, then it is switched to its 0 state if line 166 is concurrently activated. However, if as shown for element 156, the initial state of the biased element is 0, then there is no change of state thereof due to a signal on line 182.

With no change of the biased element in response to a signal on line 182, no appreciable output signal is induced on output line 184. Consequently, there is then no inhibiting by a signal to the inhibit input 186 via amplifier 188, and inhibit gate 190 passes the delayed pulse to a set-to-1 driver 192, the output of which is also coupled to input line 182. An output signal from driver 192 consequently changes the biased but unswitched element to its 1 state. On the other hand, if a biased element in the lowest order is switched due to a signal from driver 180, the inhibit gate 190 prevents any passage of the delayed signal and consequently there is no output from driver 192, maintaining the previously switched element in the state to which it was switched by the signal from driver 180. In other words, due mainly to the And-Not function of inhibit gate 190, a biased element of the lowest order gets switched from its second state (0) to its first state (1) by the delayed pulse via driver 192 only if that element was not initially switched from its first state (1) to its second state (0) by the pulse as applied via driver 180.

The output of delay 178 is also coupled to gate 194. This gate is of the non-inhibit type and receives at its second input the sensed output signals via amplifier 188. When there is coincidence of the inputs to gate 194, those inputs are effectively Anded to provide an output from gate 194 on line 196. This applies an input to Or circuit 174, which otherwise may receive an input from the second stage of the addend register 170.

The second and third orders of elements have their respectively associated drivers, gates, and delays operated similarly to the way described for those associated with the first order.

To exemplify the operation completely, the binary number 011, decimal 3, may be assumed to be stored in the selected register, for example in magnetic elements 150–154, while the same binary number is stored in the addend register 170. Under these conditions, a pulse, indicative of a binary 1, appears on the two lower output lines from the addend register respectively to Or circuits 172, 174. Consequently, magnetic element 150 will be switched from 1 to 0, causing a carry signal to be propagated from gate 194 to Or circuit 174. Previously, and at the same time as element 150 was so switched, element 152 was also switched but by the output from the second stage of the addend register. That is, the pulse from that stage as applied through driver 198 switched element 152 from 1 to 0, and effected an output signal on sense line 200. Gate 202 was thereby inhibited but gate 204 enabled to pass the pulse from the addend register via delay 206, as a carry pulse to Or circuit 176. At this same time, the previously generated carry pulse on line 196 as presented to element 152 via set-to-0 driver 198, has no effect on element 152 since it is already in its 0 state. However, this lack of switching provides no inhibit pulse to gate 202, and the delayed carry pulse is applied therethrough to driver 208 which resets element 152 to 1.

The initial switching of element 152 from 1 to 0 caused an output from the And gate 204, and this output is applied via Or circuit 176 to delay 210 and the set-to-0 driver 212. Since element 154 was initially in its 0 state, no switching thereof is thereby effected. However, this lack of switching allows the carry pulse which arrives via delay 210 to pass inhibit gate 214 and energize the set-to-1 driver 216, causing element 154 to change to its 1 state. This change of state of element 154 causes a signal to be induced on output line 218, but this induced signal is of the wrong polarity to be Anded in gate 220 with the output of delay 210. Consequently, there is no end-around carry pulse via line 222 for energizing Or circuit 172.

From the above description, it will be apparent that elements 152 and 154 have been changed to their 1 states, while element 150 has been changed to its 0 state, giving a resulting binary number of 110 which is equal to decimal 6. Addition of the binary number in the addend register 170 and the particular augend register selected has consequently been accurately effected.

As is now apparent from the foregoing, the FIGURE 2 adding memory may be operated similarly to the counting memory of FIGURE 1 to effect updating by decimal 1 if no end-around carry is employed and Or circuit 172 receives the count pulse.

For clarity, the normal read and write drive lines used to load information into and out of the FIGURES 1 and 2 memories are not shown but may be added as required, using the above described input and output lines for these additional purposes as desired.

Thus it is apparent that this invention successfully achieves the various objects and advantages herein set forth.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined by the appended claims.

What is claimed is:

1. In a memory which has at least one memory register including at least two successive bistable stages respectively of lower and higher order each of which is switchable between first and second stable states and represents by its instant state a binary value of one digit of the binary number in the register, updating provisions comprising sensing means respectively coupled to said stages for developing a binary valued signal indicative of switching or no switching of the respective stage from its said first state to its second state, means applying a given signal to the said lower order stage for causing initial switching of that stage from its said first state to its second state if not already in the latter, means responsive to the said binary valued signal from the lower order sensing means for causing said given signal at that time to switch said lower order stage from its said second state to its first state only if it was not initially switched as aforesaid from its first to second state and to initially switch the said higher order stage from its said first state to its second state if not already in the latter, and means responsive to the said binary valued signal from the higher order sensing means for causing said given signal at that time to switch the higher order stage from its said second state to its first state only if it was not initially switched as aforesaid from its first to second state.

2. Apparatus as in claim 1 wherein each of the means responsive to the binary signal from the respective sensing means includes means for delaying the said given signal and Anding the delayed signal with an inverted output of the associated sensing means.

3. Apparatus as in claim 1 wherein each of the said means responsive to the binary signal from the respective sensing means comprises gating means including at least an inhibit gate having an inhibit input coupled to the output of the respective sensing means and a signal input and a delay passing said given signal when received at least to the respective signal input of the respective gating means, at the time correponding to the time the respective binary signal is being received at the respective inhibit input, the output signals of the lower order gating means being coupled to the input of the higher order delay and to the lower order stage to switch that stage from its said second to first state only if it was not initially switched from its first to second state as aforesaid, an output signal from the higher order inhibit gate being coupled to effect switching of the higher order stage from its said second to first state as aforesaid.

4. Apparatus as in claim 3 wherein the output of the lower order inhibit gate is coupled to the input of the higher order delay and also to the input of the higher order stage to switch it as aforesaid and further to an input of the lower order stage to switch that stage as aforesaid.

5. Apparatus as in claim 3 wherein each of said gating means includes a second gate which is of the non-inhibit type and has two signal inputs respectively coupled to the output of the associated stage and the output of the associated delay, the output of the second gate for the lower order stage being coupled to the delay and input of the higher order stage with the output of the lower order inhibit gate being coupled to the lower order stage to switch that stage as aforesaid.

6. Apparatus as in claim 1 wherein each of said bistable stages includes a different bistable magnetic element.

7. Apparatus as in claim 6 wherein each bistable magnetic element includes a ferromagnetic film which has uniaxial anistropy.

8. In a memory which includes a plurality of memory registers each of which has at least two successive bistable stages respectively of lower and higher order, said stages being switchable between said first and second stable states when primed with each stage representing by its instant state a binary value of one digit of the binary number in the respective register, the improvement including updating provisions comprising a plurality of sensing means coupled one to each different order of stages for developing a binary valued signal indicative of switching or non-switching of any stage in the respective order from its said first state to its second state, means for priming each of the stages selectively by registers, means applying a given signal to the primed lower order stage of the selected register for causing initial switching of that stage from its said first state to its second state if not already in the latter, means responsive to the said binary valued signal from the lower order sensing means for causing said given signal as it exists at that time to switch the said primed lower order stage from its said second state to its first state only if it was not already switched as aforesaid from its first to its second state and to initially switch the primed higher order stage of the selected register from its said first state to its second state if not already in the latter, and means responsive to the said binary valued signal from the higher order sensing means for causing said given signal as it exists at that time to switch the said primed higher order stage from its said second state to its first state only if it was not initially switched as aforesaid from its first to second state.

9. Apparatus as in claim 8 wherein each of the means responsive to the binary signal from the respective sensing means includes means for delaying the said given signal and Anding the delayed signal with an inverted output of the associated sensing means.

10. Apparatus as in claim 8 wherein each of the said means responsive to the binary signal from the respective sensing means comprises gating means including at least an inhibit gate having an inhibit input coupled to the output of the respective sensing means and a signal input, and a delay passing said given signal when received at least to the respective said signal input of the respective gating means at the time corresponding to the time the respective binary signal is being received at the respective inhibit input, the output signals of the lower order gating means being coupled to the input of the higher order delay and to the lower order stages to switch the said primed lower order stage from its said second to first state only if it was not initially switched from its first to second state as aforesaid, an output signal from the higher order inhibit gate being coupled to effect switching of the said primed higher order stage from its said second to its first state as aforesaid.

11. Apparatus as in claim 10 wherein the output of the lower order inhibit gate is coupled to the input of the primed higher order stage to switch it as aforesaid and further to the input of the said primed lower order stage to switch that stage as aforesaid.

12. Apparatus as in claim 10 wherein each of said gating means includes a second gate which is of the non-inhibit type and has two signal inputs respectively coupled to the output of the associated stage order and the output of the associated delay, the output of the second gate for the lower stage order being coupled to the delay of the higher order stage and to an input of the primed higher order stage with the output of the lower order inhibit gate being coupled to the primed lower order stage to switch that stage as aforesaid.

13. Apparatus as in claim 8 wherein each stage of each of said registers includes a bistable magnetic element switchable between states by said given signal only if concurrently magnetically biased, said priming means including means for applying a biasing field to each magnetic element of any of said registers one register at a time.

14. Apparatus as in claim 13 wherein each of said magnetic elements is a ferromagnetic film having uniaxial anisotropy, and wherein the biasing means is effective to apply a field transverse to the remanent magnetization axis of the film in the plane therof.

15. A binary memory with updating provisions comprising a plurality of bistable stages switchable between first and second states, a plurality of delays respectively associated with said stages, means for applying a signal to an input of the lowest order stage and concurrently to the delay associated therewith, and a plurality of means respectively responsive to the stage outputs for conditionally applying the delayed signal associated with that stage to an input of that and of the next higher order stage and to the delay for that next stage.

16. A binary memory as in claim 15 wherein each of said stages includes a magnetic element switchable when biased by the said signal respectively applied to the respective stage, and further including means for magnetically biasing each of said magnetic elements.

17. Apparatus as in claim 15 wherein each of the said conditionally applying means includes an inhibit gate having an inhibit input coupled to the respective stage output and a signal input coupled to the output of the respective delay, the output of the inhibit gate being coupled to the input of the delay for the next higher order stage, to said input of that stage, and to a second input of its own stage.

18. Apparatus as in claim 15 wherein each of the said conditionally applying means includes two gates only one of which is of the inhibit type, the output of the associated delay being coupled to a signal input of each of those gates with the output of the associated stage being coupled to the inhibit input of the inhibit gate and to a second signal input of the other gate, the output of the inhibit gate being coupled as an input to the associated stage and the output of the second gate being coupled as an input to the next higher order stage and its delay.

19. Apparatus as in claim 18 usable as an adding memory and including an addend register having a plurality of binary stages, means for connecting a register stage output respectively to an input of each of said switchable bistable stages in parallel with the input of the delay associated with that stage, and means coupling the output of the highest order non-inhibit type gate in parallel with the output of the lowest order register stage.

20. A binary memory with updating provisions comprising a plurality of bistable stages arranged in groups with each group representing a binary number, each stage being switchable between first and second states when primed, means for priming each of the stages selectively by groups, a plurality of delays respectively associated with corresponding stage orders, means for applying a signal to an input of the lowest order stage and concurrently to the delay associated therewith for switching the primed lowest order stage if then switchable thereby, and a plurality of means respectively responsive to the different stage order outputs for conditionally applying the delayed signal associated with each stage order to an input of the primed stage in the same order, to the primed stage of the next higher order, and to the delay for that next stage.

21. Apparatus as in claim 20 wherein each of the said conditionally applying means includes an inhibit input coupled to the output of the respective stage order and a signal input coupled to the output of the respective delay, the output of the inhibit gate being coupled to the input of the delay for the next higher stage order, to the set-to-first state input of each stage of that order, and to the set-to-second state input of each stage for its own order.

22. Apparatus as in claim 20 wherein each of the said conditionally applying means includes two gates only one of which is of the inhibit type, the output of the associated delay being coupled to a signal input of each of those gates with the output of the associated order of stages being coupled to the inhibit input of the inhibit gate and to a second signal input of the other gate, the output of the inhibit gate being coupled as a set-to-first state input to each of the stages in the associated order and the output of the second gate being coupled as a set-to-second state input to each of the stages in the next higher order and to its delay.

23. A binary memory with updating provisions comprising a plurality of bistable stages switchable between first and second states, a plurality of inhibit gates respectively coupled at an inhibit input to the stage outputs, a plurality of delays respectively coupled at their output to the inhibit gates at their signal input, means for each stage for applying an input signal to the respective stage and delay including means coupling the delayed input signal of any stage as the input signal to the next higher order stage and its associated delay, and means for coupling the output signal of each inhibit gate to an input of its respective stage.

24. A binary memory as in claim 23 wherein each of said bistable stages includes a magnetic element switchable when biased by the input signal respectively applied to the respective stage, and further including means for magnetically biasing each of the said magnetic elements.

25. A binary memory as in claim 23 usable as a counting memory for updating by a decimal 1 count, wherein the output of each inhibit gate is the input signal for the respective stage delayed by the associated delay and is coupled both to the input of its own stage as well as to the input of the next higher order stage and its associated delay.

26. A binary memory as in claim 23 usable as an adding memory, and further including an addend register having a plurality of binary stages, and means for coupling the said binary stage outputs respectively to an input of each of said bistable stages in parallel with the respectively associated delays, a plurality of non-inhibit type gates each having two inputs respectively coupled to the output of one of said bistable stages and to the output of the delay associated with that stage, the outputs of the non-inhibit gates being coupled in parallel respectively with the next higher order register stage outputs to the input and delay for that next higher order stage.

27. A binary memory with updating provisions comprising a plurality of bistable stages arranged in groups which represent respective binary numbers with each said stage being switchable between first and second states when primed, means for selecting any one of said groups by priming each stage of a group, a plurality of inhibit gates respectively coupled at an inhibit input to the stage order outputs, a plurality of delays respectively coupled at their output to the inhibit gates at their signal input, means for each order of stages for applying an input signal to the respective stage order and delay including means coupling the delayed input signal of any stage order as the input signal to the next higher order of stages and its delay, and means for coupling the output signal of each inhibit gate to an input of the primed stage in its respective order.

28. A binary counting memory comprising a plurality of magnetic elements arranged in groups which represent respective binary numbers, each of said magnetic elements being switchable between first and second stable states when biased, means for selecting any one of said groups by magnetically biasing each element of a group, a plurality of inhibit gates respectively coupled at an inhibit input to the different orders of elements with the output of each element in any one order being coupled to a respective gate inhibit input, a plurality of delays respectively coupled at their output to the inhibit gates at their signal input, means coupling the output of each inhibit gate in parallel to the input of the delay of the next higher order of elements if any, to an input of each element in any such next higher order, and to a second input of each element of the order of elements associated with the respective inhibit gate, and means for applying a count pulse to the first input of the lowest order of elements and simultaneously to the input of the delay associated with that element order, the arrangement being such that upon applying said count pulse to the lowest order of elements, the group of elements which is then biased effect propagation of that count pulse from the lowest order to the highest order depending upon the initial state of the biased element in each order, whereby the binary number originally in the biased group of elements is updated by a decimal 1.

29. A memory as in claim 28 wherein each of said magnetic elements includes a different ferromagnetic film having uniaxial anisotropy effecting a single easy axis of magnetization and a single hard axis of magnetization transverse to said easy axis, and wherein the biasing means causes a field along the hard axis of each film in any selected group thereof and the count pulse when applied to any film causes along the easy axis of that film a field, which without the aid of the transverse biasing field concurrently on that film, is insufficient to switch that film to its opposite state even if of the proper polarity to do so.

30. A binary adding memory comprising a plurality of magnetic elements arranged in groups which represent respective binary numbers, each said element being switchable between first and second stable states when biased, means for selecting any one of said groups by biasing each element in a group, a plurality of pairs of gates one of which is of the inhibit type and the other of which is of the non-inhibit type, each pair of gates being coupled to the output of a different numerical order of elements, a plurality of delays respectively coupled at their outputs to an input of each gate in each of said pairs, an addend register having a plurality of stages, a plurality of Or circuits respectively coupled to the outputs of said register stages, the output of each non-inhibit type gate being coupled to an input of the Or circuit for the next higher order with the highest order non-inhibit gate output being coupled to an input of the Or circuit for the lowest order stage, the output of each inhibit gate being coupled to an input of each of the elements in its own order, and means coupling the output of the Or circuits respectively to the associated order delays and also to an input of each element of the associated order thereof, the arrangement being such that the binary number of any group of biased elements is updated in accordance with the binary number supplied to said Or circuits from said addend register.

31. A memory as in claim 30 wherein each of said magnetic elements includes a different ferromagnetic film having uniaxial anisotropy effecting a single easy axis of magnetization and a single hard axis of magnetization transverse to said easy axis, and wherein the biasing means causes a field along the hard axis of each film in any selected group thereof and the count pulse when applied to any film causes along the easy axis of that film a field, which without the aid of the transverse biasing field concurrently on that film, is insufficient to switch that film to its opposite state even if of the proper polarity to do so.

References Cited in the file of this patent

UNITED STATES PATENTS

| | | |
|---|---|---|
| 2,843,317 | Steagall | July 15, 1958 |
| 2,960,684 | Auerbach | Nov. 15, 1960 |
| 2,962,215 | Haynes | Nov. 29, 1960 |
| 2,968,797 | Sard et al. | Jan. 17, 1961 |